(12) United States Patent
Solimar Walter

(10) Patent No.: US 10,681,866 B2
(45) Date of Patent: Jun. 16, 2020

(54) LOCK PROVING SYSTEM FOR AN AGRICULTURAL MACHINE ATTACHMENT

(71) Applicant: AGCO DO BRASIL SA LTDA, Ribeireo Preto (BR)

(72) Inventor: Airton Solimar Walter, Nova Sant Rita (BR)

(73) Assignee: AGCO DO BRASIL SA LTDA, Ribeireo Preto, Sau Paulo (BR)

( * ) Notice: Subject to any disclaimer, the term of this patent is extended or adjusted under 35 U.S.C. 154(b) by 219 days.

(21) Appl. No.: 15/917,927

(22) Filed: Mar. 12, 2018

(65) Prior Publication Data

US 2018/0255707 A1    Sep. 13, 2018

(30) Foreign Application Priority Data

Mar. 10, 2017 (GB) .................................. 1703831.6

(51) Int. Cl.
| | | |
|---|---|---|
| *A01D 41/16* | (2006.01) | |
| *E02F 3/36* | (2006.01) | |
| *A01B 59/06* | (2006.01) | |
| *A01B 59/00* | (2006.01) | |

(52) U.S. Cl.
CPC ............ *A01D 41/16* (2013.01); *A01B 59/002* (2013.01); *A01B 59/064* (2013.01); *E02F 3/3604* (2013.01); *E02F 3/3636* (2013.01); *E02F 3/3659* (2013.01); *E02F 3/3663* (2013.01)

(58) Field of Classification Search
CPC ...... A01D 41/16; E02F 3/3631; E02F 3/3659; E02F 3/3672; E02F 3/365; E02F 3/3663; E02F 3/3604; E02F 3/3636; A01B 59/002; A01B 59/062; A01B 59/064

USPC ............... 37/403–411, 468; 414/723; 56/153
See application file for complete search history.

(56) References Cited

U.S. PATENT DOCUMENTS

| | | | | |
|---|---|---|---|---|
| 6,301,811 | B1* | 10/2001 | Gilmore, Jr. .......... | E02F 3/3622 37/468 |
| 7,001,137 | B2* | 2/2006 | Perrin ................... | A01B 59/062 37/468 |
| 7,467,918 | B2* | 12/2008 | Yao ........................ | E02F 3/3663 37/468 |
| 8,549,775 | B2* | 10/2013 | Lanting ................. | E02F 3/3631 37/468 |
| 2004/0228717 | A1 | 11/2004 | Perrin et al. | |

OTHER PUBLICATIONS

UK Intellectual Property Office, International Search Report for UK Priority Application GB 1703831.6, dated Sep. 7, 2017.

* cited by examiner

*Primary Examiner* — Robert E Pezzuto

(57) ABSTRACT

A lock proving system provides a positive indication when a locking mechanism has correctly latched a removable attachment to an agricultural machine, the attachment being a header for a combine harvester for example. The locking mechanism includes a locking element that is shiftable into a locking position in which, provided the attachment is mounted to the machine with the correct alignment, the locking element acts upon a lock proving mechanism that is mounted to the attachment. The lock proving mechanism delivers mechanical feedback to the machine, the action of which is detected by a sensing device mounted upon the machine.

24 Claims, 6 Drawing Sheets

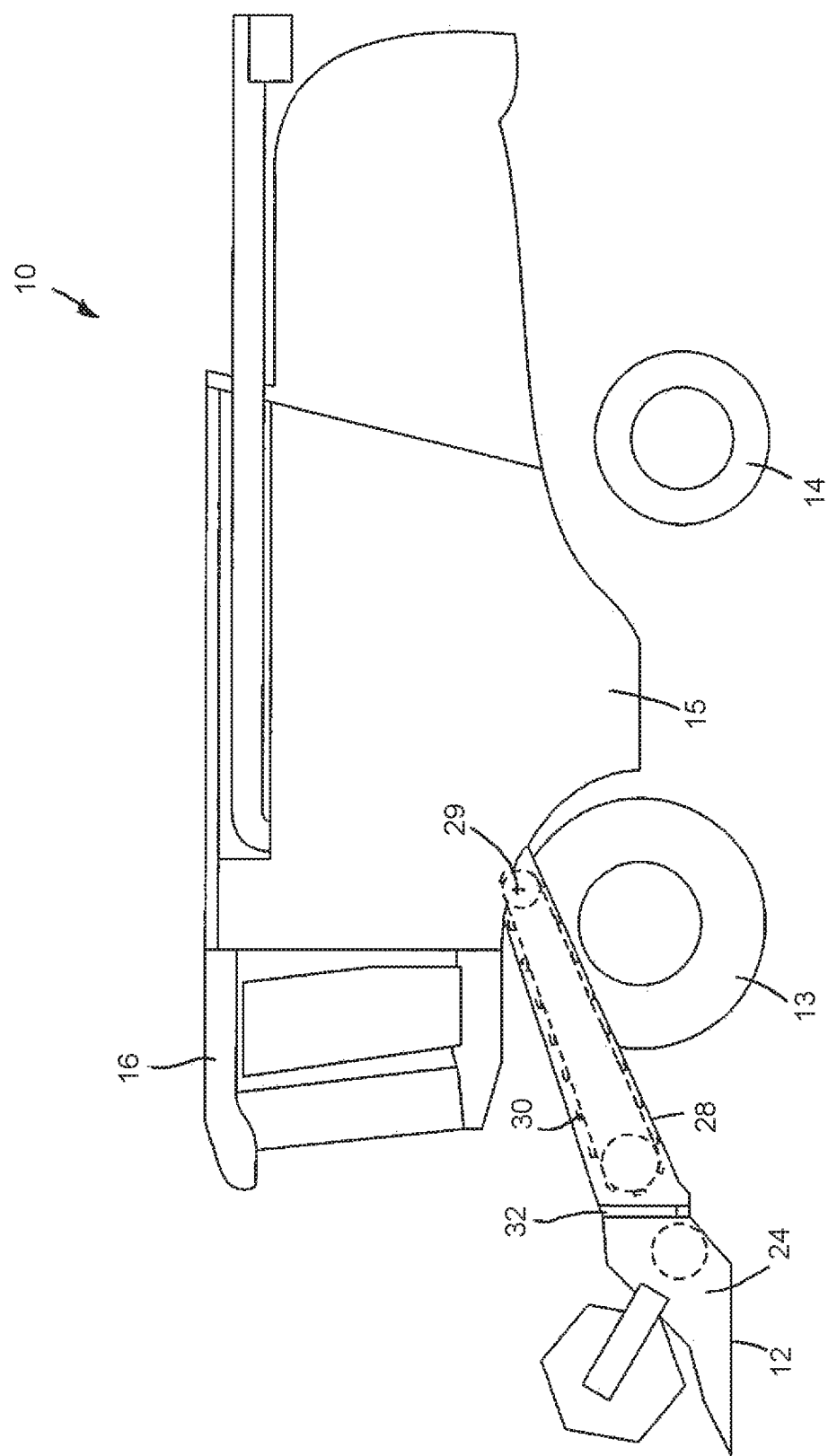

LOCK PROVING SYSTEM FOR AN AGRICULTURAL MACHINE ATTACHMENT

BACKGROUND

Technical Field

The invention relates to lock proving systems which provide a positive indication or signal when a locking mechanism is engaged correctly with a removable attachment that is mounted to the frame of an agricultural or industrial machine.

Description of Related Art

Various agricultural and industrial machines include removable or interchangeable attachments which allow the configuration or functionality of the machine to be adapted to different tasks. For example, self-propelled agricultural harvesters such as combine harvesters and forage harvesters commonly include wide crop-gathering headers which are mounted to the harvester during field operations but removed for transport on the road. In another example, utility tractors are often fitted with front loaders to which a range of different tool attachments can be mounted, including by way of example bale forks, silage grabs and buckets for handling bulk material.

In all examples the attachments must be secured to the machine and, typically, a locking or latching mechanism of some form is provided. U.S. Pat. No. 6,735,929 discloses an example of a latching mechanism that includes shiftable pins carried on a combine, the pins serving to mechanically couple an attached header to the combine. U.S. Pat. No. 5,263,810 discloses an example locking mechanism associated with a front loader fitted to a tractor, the locking mechanism including shiftable pins that engage a socket on a bucket attachment.

For safety reasons the operator must ensure that an attachment is secured in the desired mounted position before moving or indeed operating the machine. Failure to do so may result in the attachment becoming inadvertently detached or damaged. In some cases the mechanical locking mechanism provided may include a visual indication that the associated locking elements are in the locking position. For example, it may be possible for the operator to see that a lever is in a position that corresponds with the locking position. However, knowing that the locking mechanism is in a locking position does not necessarily guarantee that the locking mechanism is correctly engaged with the attachment. For example, and most commonly, the attachment may not me positioned in the mounted position correctly despite visible deployment of the locking mechanism.

In order to ensure that a locking mechanism has engaged with the attachment correctly, the operator is often required to leave the machine cab and observe at close range, especially if the locking mechanism is out of sight from the cab.

SUMMARY OF THE INVENTION

In accordance with the invention there is provided a lock proving system for an agricultural machine attachment comprising:
  a frame supported by an agricultural machine;
  a removable attachment configured to be mounted upon and supported by the frame in a mounted position;
  a locking mechanism mounted to the frame and comprising a locking element that is shiftable between a retracted position and a locking position;
  a lock proving mechanism mounted to the attachment and comprising an input element mechanically coupled to an output element; and,
  a sensing device mounted to the frame and positioned so as to detect the presence of the output element when in a proving position;
  wherein the frame, attachment and locking mechanism are configured such that, when the attachment is in the mounted position and the locking element is in the locking position, the locking element secures the attachment to the frame, and,
  wherein the locking element, when moved from the retracted position to the locking position, contacts and pushes the input element which causes the output element to shift into the proving position.

By providing a lock proving mechanism on the attachment in combination with a sensing device on the machine, a positive indication that the locking mechanism has engaged correctly can be given without the need for any electrical or hydraulic supply on the attachment. The invention involves the recognition that in most cases the attachment has no electrically- or hydraulically-active systems at least until suitable connections are made with the machine.

The lock proving mechanism is responsive to interaction with the locking mechanism and delivers mechanical feedback to the machine which is detected by the sensing device. The sensing device may produce a signal that is representative of lock proving, this signal being converted into a positive indication by an electronic control unit for example.

Conversely, in the event of the attachment not being aligned sufficiently for the locking mechanism to engage properly, the lock proving mechanism will not activate and, as such, the positive indication of locking will not detected by the sensing device. In one embodiment, this may prevent an on-board control system from further operation of the machine or attachment.

In one embodiment the input element of the lock proving mechanism comprises a first pin, the output element comprises a second pin, and the first pin is coupled to the second pin by a lever which translates linear movement of the first pin into linear movement of the second pin. The input element may be positioned so as to be coaxial with the locking element when the attachment is in the mounted position. As such, the locking element may abut and push one end of the input element when extending into the locking position.

The first and second pins of the lock proving mechanism may be aligned parallel to one another in a spaced relationship, wherein the lever pivots on an intermediate fulcrum which causes the pins to move in opposing directions. As such movement of the first pin away from the machine (forced by extension of the locking element) is translated into movement of the second pin towards the machine.

The lock proving mechanism is preferably spring-loaded so as to bias the output element away from the proving position. Advantageously, the lock proving device therefore defaults to a non-proving position (in the absence of an engaged locking element) and is thus failsafe.

The lock proving mechanism is preferably enclosed in a housing to protect the constituent components from weather-related corrosion and dirt ingress.

In a preferred arrangement, the input element may comprise an extension portion that protrudes outside of the housing when the output element is in the proving position so as to provide a visual indicator to an operator. Therefore, in the event of failure of the sensing device, a direct visual indication that the locking mechanism is proved is shown to the operator.

The frame may be conveniently provided with a socket into which the output element extends when in the proving position.

The locking element may comprises one or more bolts or pins. The attachment is preferably provided with corresponding sockets into which the bolt engages when the attachment is in the mounted position and the locking element is in the locking position. In one embodiment the locking element, or elements, extend away from the frame when shifting between the retracted position and the locking position, in a similar manner to the arrangement disclosed by U.S. Pat. No. 6,735,929 for example. The locking mechanism may comprise an actuator for controlling movement of the locking element between the retracted position and the locking position.

The sensing device may be any type of sensor capable of detecting the presence of the output element when in the proving position. For example the sensing device may be a proximity sensor or a micro-switch which is operated by direct contact with the output element.

In another preferred embodiment the sensing device is in communication with an electronic control unit (ECU), which may also be in communication with a visual or audible indicator, wherein the visual or audible indicator is activated in response to a positive signal from the sensing device corresponding to sensing of the output element.

The invention lends itself to a host of different agricultural and industrial machines that involve the mounting and removal of different tool attachments, especially where the provision of a positive indication of successful locking would be beneficial. In the case of agricultural machines, the invention is particularly suited to harvester header attachments and tractor front loader tool attachments.

In an example embodiment of the invention in a harvesting machine there may also be provided a driveline coupling system for automatically coupling and uncoupling a driveline between the frame and the header, wherein the coupling system is activated by an ECU only when a positive signal from the sensing device corresponding to sensing of the output element has been received. It is recognised that correct alignment and securing of the header is critical for successful operation of the automatic coupling of the driveline. The lock proving system conveniently provides a feedback signal to the ECU to 'release' or allow activation of the driveline coupling system. Conversely, the driveline coupling system may be rendered inactive by the ECU until the locking mechanism is proved or the ECU is overridden by the operator for example.

In a preferred embodiment in a harvester, the frame forms part of a feederhouse which is pivotally mounted to a wheeled chassis and houses a crop conveyor, wherein the attachment is a crop gathering header configured for mounting to a front side of the feederhouse. A tilt frame may be mounted to the front side of the feederhouse so as to permit relative movement around a generally longitudinal axis for adjustment of lateral tilt of the header. The locking mechanism and sensing device may be conveniently mounted to the tilt frame.

BRIEF DESCRIPTION OF THE DRAWINGS

Further advantages of the invention will become apparent from reading the following description of specific embodiments with reference to the appended drawings in which:

FIG. 2 is a schematic side elevation of the combine harvester of FIG. 1, showing part of the feederhouse cut-away to reveal the elevator housed therein.

DETAILED DESCRIPTION OF EMBODIMENTS OF THE INVENTION

Example embodiments of the invention will now be described with references throughout the section to alternative constructions and arrangements, which are given by way of example only. Although the following description focuses on implementation of the invention in agricultural machines, it should be appreciated that the invention has further application in non-agricultural applications such as industrial tractors and plant machinery.

Figure 1:
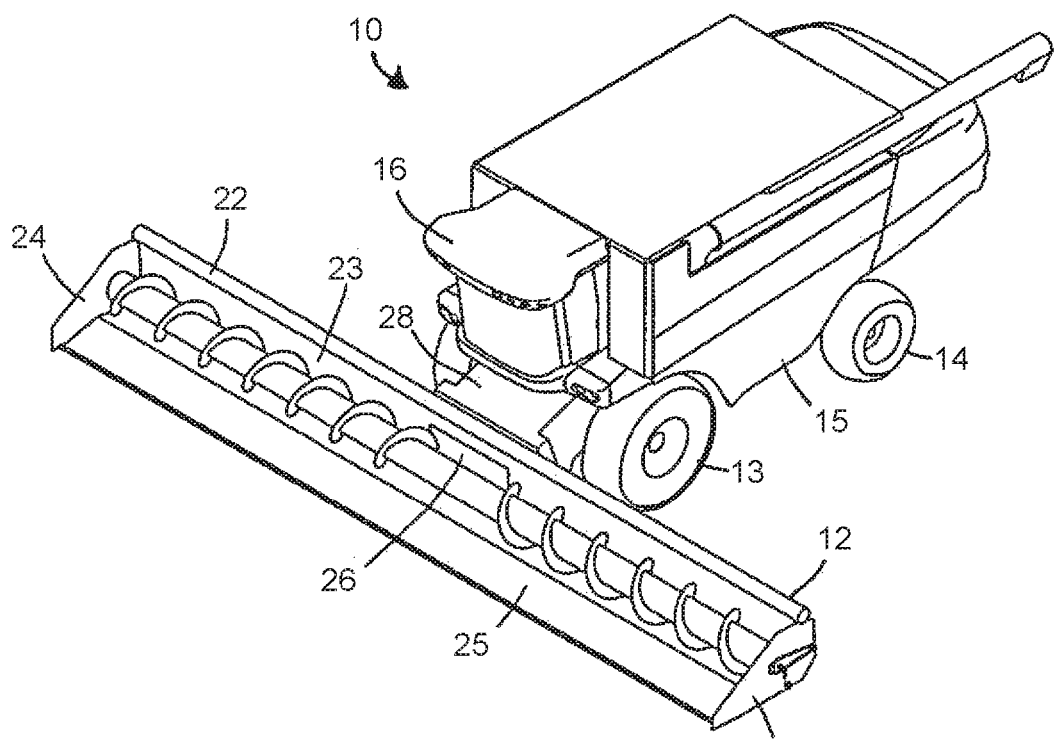
FIG. 1 is a schematic perspective view of a combine harvester with a crop gathering header mounted thereto, the harvester being suitable to embody aspects of the invention.

A first illustrated embodiment of the invention comprises a combine harvester 10 with a detachable crop-gathering header 12 as shown in FIGS. 1 and 2. The combine harvester 10, hereinafter referred to simply as 'combine', comprises front and rear ground-engaging wheels 13, 14 mounted upon a chassis designated generally at 15. Although not important to the understanding of the invention, the combine 10 serves to process crop material gather by the header 12 including the threshing, separation and cleaning of grain. The collected grain is stored in an on-board tank (not shown) whilst the crop residue is ejected from the rear of the combine 10 in a known manner.

An operator drives the combine 10 from a forward-facing cab 16 from where they can observe the operation of the header 12 during a harvest operation. Inside the cab 16 there is located a controller 18 and an operator console 19 which will be described in more detail below.

The combine 10 comprises a lock proving system for providing a positive indication that the header has been latched to the combine in the correct manner. Features of the lock proving system will now be described.

The header 12 comprises a header frame 22 which includes a rear wall 23, end walls 24 and a floor 25. A cutterbar (not shown) is typically provided along a front edge of the floor 25. However, the invention does not preclude pick-up headers which have no cutterbar. The rear wall 23 comprises a centrally-located opening 26 through which gathered crop material is conveyed into the combine 10.

Turning back to the combine 10, a feederhouse 28 is pivotally mounted to the chassis 15 to allow raising and lowering thereof around a transverse lift axis 29. Hydraulic lift cylinders (not shown) are connected between the chassis 15 and the underside of the feederhouse 28 to control lifting and lowering of the feederhouse 28 and attached header 12. The feederhouse houses a chain and slat conveyor 30 in a known manner.

A tilt frame 32 is mounted to the front side of the feederhouse 28 so as to permit relative movement around a generally longitudinal axis for adjustment of lateral tilt of the header 12. The tilt frame 32 and feederhouse 28 are configured to present a continuous duct through which the crop material is conveyed regardless of the tilt angle.

Figure 6A:
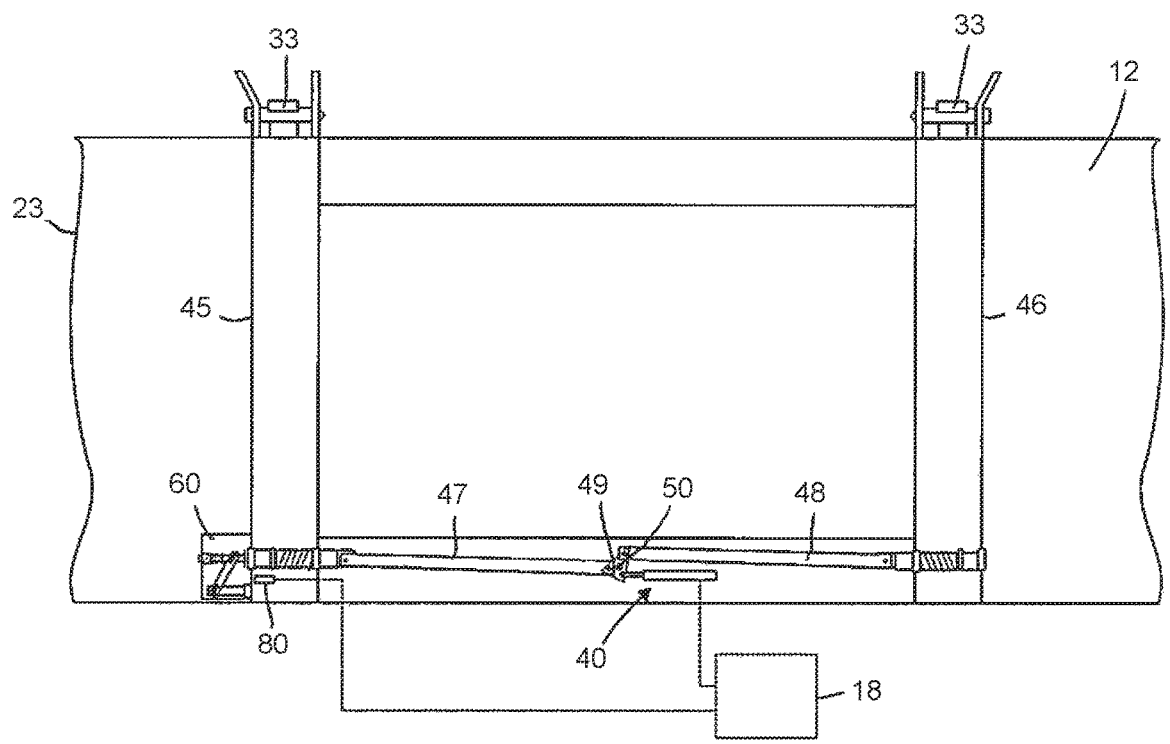
FIG. 6A is a rear view of the tilt frame of FIG. 4 showing a header (with lock proving mechanism) in a mounted position, the locking mechanism being shown in the retracted position.

The header 12 includes a pair of hooks 33 (FIG. 6A) which engage respective support pins 34 which are secured to the top side of tilt frame 32. When attaching the header 12, the feederhouse 28 is aligned so that the pins 34 are positioned under the hooks 33, and then the feederhouse 28 is lifted so as o engage the pins 34 under the hooks 33. This aspect of the attachment process is well known.

When the header 12 is in a desired 'mounted position' the central header opening 26 is aligned with the inlet 36 of feederhouse 28 and the rear header wall 23 abuts the front face of tilt frame 32.

Although the header 12 can be lifted and lowered when the hooks and pins 33, 34 engage, a locking mechanism 40 is provided to properly secure and latch the header 12 to the combine 10 and prevent any separation thereof when in operation. The locking mechanism 40 described and illustrated is similar to that disclosed by U.S. Pat. No. 6,735,929. However, it should be appreciated that alternative locking mechanisms with shifting locking elements can be used instead whilst remaining within the scope of the invention.

Figure 5:
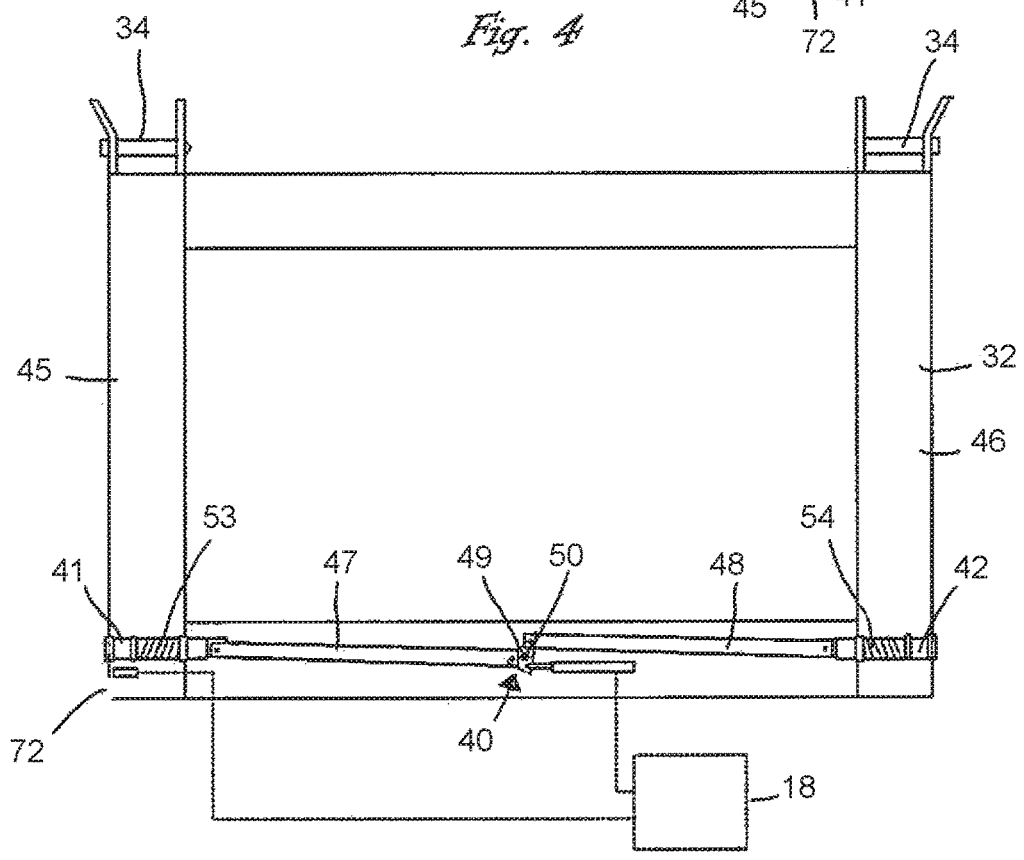
FIG. 5 is a rear view of the tilt frame of FIG. 4 showing the locking mechanism and sensing device which form part of the lock proving system in accordance with the first embodiment of the invention, the locking mechanism being shown in the retracted position.
Figure 6B:
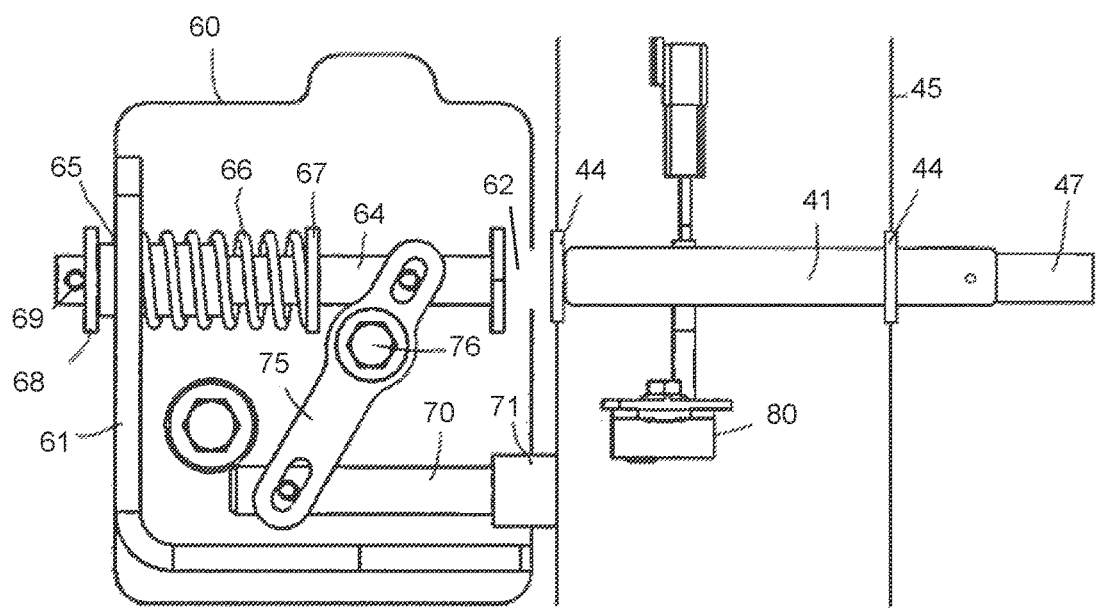
FIG. 6B is an enlarged view of the lock proving system in accordance with the first embodiment of the invention, the locking mechanism being shown in the retracted position.

With reference to FIG. 5, the locking mechanism 40 is mounted to a lower portion of tilt frame 32 and comprises a pair of bolts 41, 42 which are each supported in a transverse alignment in bushes 44 (FIG. 6B) which are secured in the walls of respective upright, rectangular-section, posts 45, 46. Each bolt 41, 42 is connected at an inner end to a respective tie rod 47, 48 which couples the bolts 41, 42 to a crank 49 which is secured to the tilt frame 32 and is pivotable around a longitudinally-aligned fulcrum.

Figure 7A:
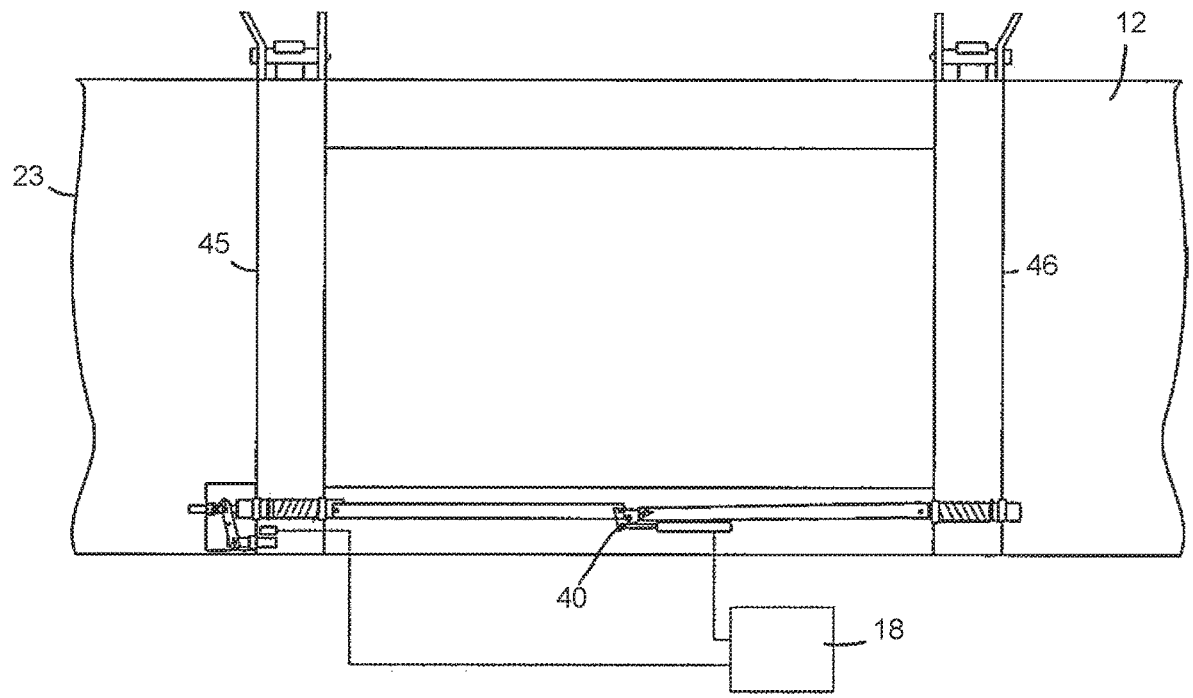
FIG. 7A is the same view as FIG. 6A but showing the locking mechanism in the locking position.

A single-acting hydraulic cylinder 50 is mounted inside the lower beam of tilt frame 32 and is coupled to the crank 49. The cylinder 50 is ultimately controlled by controller 18 and is connected thereto accordingly by means of appropriate hydraulic and/or electrical connections. The cylinder 50 controls rotation of crank 49 which translates into lateral shifting of bolts 41, 42 between a retracted position (FIGS. 5 and 6) and a locking position (FIG. 7). The bolts 41, 42 extend away from the tilt frame 32 when shifting from the retracted position to the locking position.

Each bolt 41, 42 is provided with a spring 53, 54 which is arranged to bias the bolts 41, 42 into the retracted position when pressure from the cylinder 50 is released.

In an alternative, but inferior arrangement, the locking mechanism 40 may comprise only one bolt which locks to one side of the header frame 22.

Turning back to FIGS. 6A and 6B, a lock proving mechanism 60 is secured to the rear header wall 23 adjacent one of the upright posts, in this case left-hand post 45. The lock proving mechanism 60 comprises a housing 61 which has a socket 62 formed in the inner wall located nearest to the post 45, the socket being aligned coaxially with bolt 41.

An input pin 64 is retained in a bore 65 which is formed in the outermost wall (furthest from the post 45), wherein the input pin 64 is movable along its axis. A coil spring 66 acts between a washer 67 and the housing 61 to bias the input pin towards the opening of socket 62, the limit of movement being set by a further washer 68 and roll pin 69 located on the input pin outside of the housing 61.

An output pin 70 is retained in a bore 71 which is formed in the inner wall, wherein the output pin 70 is also movable along its axis. The output pin 70 is aligned so as to be parallel with, yet radially-offset from, input pin 64 and coaxial with a feedback bore 72 provided in the outer face of tilt frame post 45.

A lever 75 couples the input pin 64 and output pin 70, and pivots around a longitudinal fulcrum 76. The linkage provided by lever 75 causes linear movement of the output pin 70 to be translated into linear movement of the input pin 64 but in the opposite direction thereto. The housing 61 serves to protect the mechanism from dirt ingress and corrosion.

The header 12, tilt frame 32 and locking mechanism 40 are configured such that, when the header 12 is in the mounted position and the locking bolt 41 is in the locking position, the locking bolt 41 secures the header 12 to the tilt frame 32 by extending into socket 62. Also, locking bolt 42 extends into an equivalent socket provided on the opposite side.

Bolt 41, when moved to the locking position, displaces the input pin 64 to the left against the force of spring 66. In turn, this causes the output pin 70 to shift to the right and extend into the post 45 through socket 72 in a "proving position", as shown in FIG. 7. The returning movement of output pin 70 back into the tilt frame 32 delivers mechanical feedback that proves correct engagement of the locking mechanism 40 with the header 12.

Figure 7B:
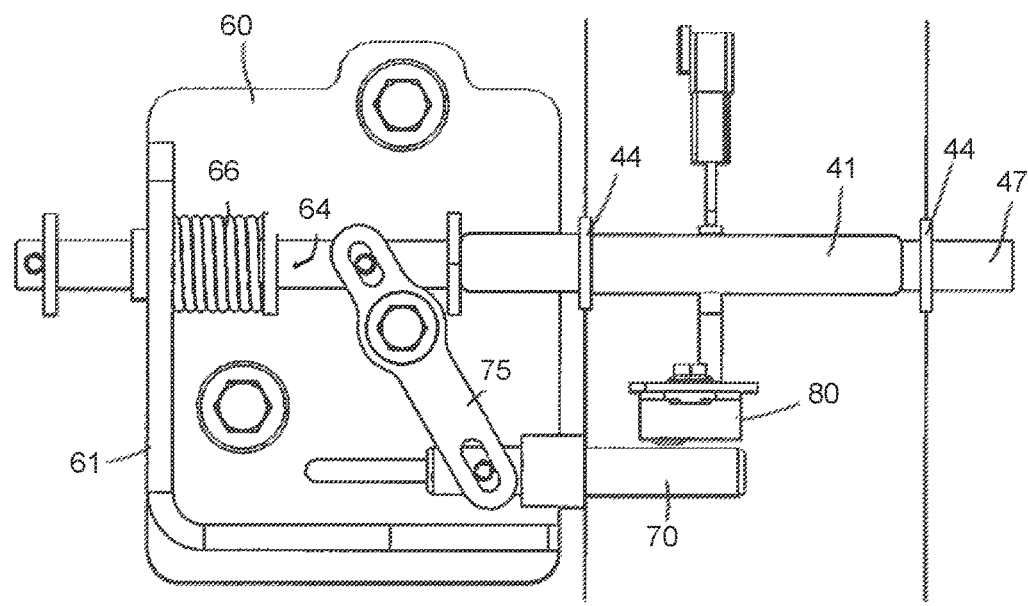
FIG. 7B is the same view as FIG. 6B but showing the locking mechanism in the locking position, and, FIG. 8 is a side elevation of an agricultural tractor and front loader which are suitable to embody aspects of the invention.
Figure 8:
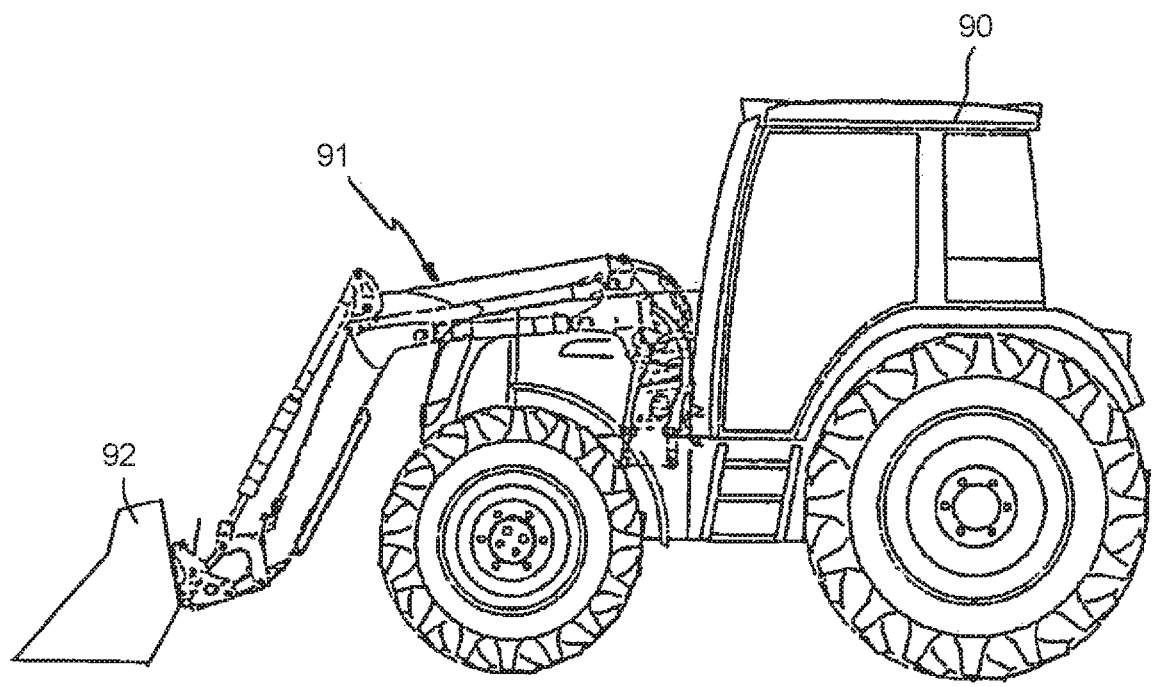

The lock proving system further comprises a proximity sensor 80 mounted inside post 45. The sensor 80 is positioned so as to detect the presence of output pin 70 in the proving position, and is connected to controller 18 by means of a wired or wireless connection. As best seen in FIG. 7B, the sensor 80 is positioned radially offset from the output pin 70 when in the proving (extended) position, by a distance that allows the sensor 80 to detect the presence of the pin 70 whilst not interfering with movement of the pin 70.

When unlatching the locking mechanism 40, the spring 66 pushes the input pin 64 and output pin 70 back into the non-proving position. The sensor 80 then ceases to generate the proving signal to the controller 18.

In an alternative embodiment, the sensor 80 may be replaced by a micro-switch this is impacted directly by movement of the output in 70. In another alternative embodiment, an optical sensing device such as a camera may be employed to detect the presence of the output pin 70 in the proving position.

Figure 3:
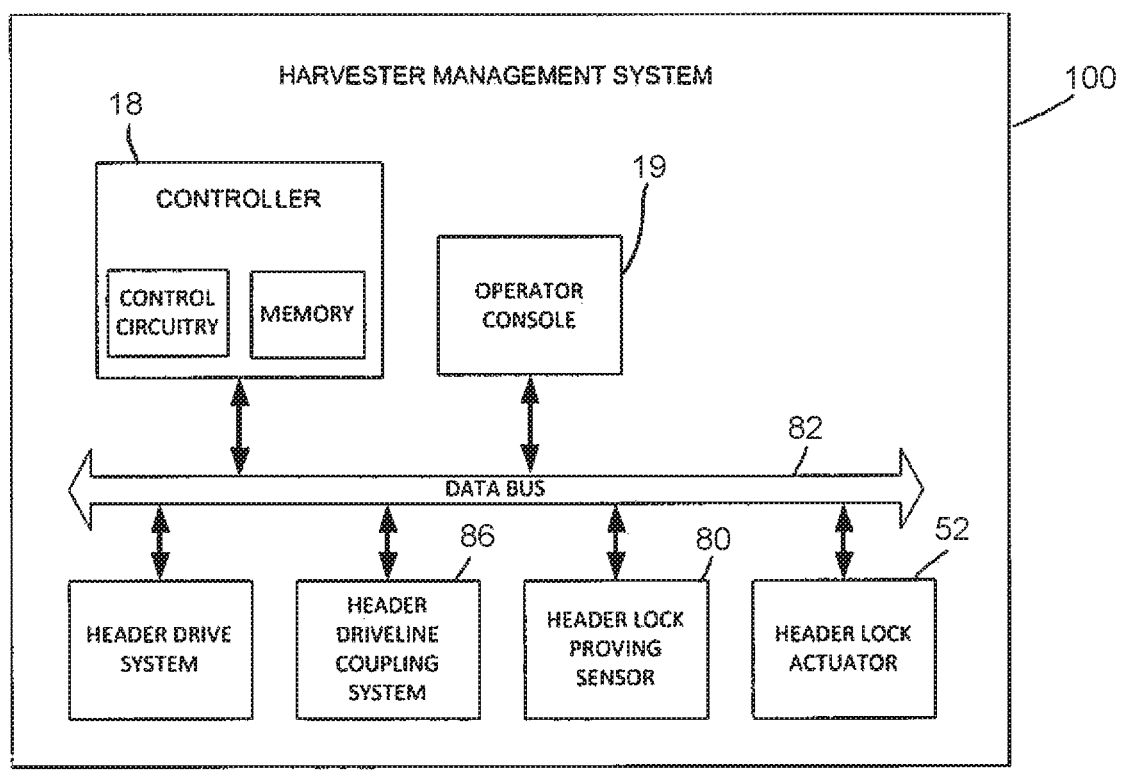
FIG. 3 is a block diagram illustrating components of a harvester management system which includes part of a lock proving system in accordance with a first embodiment of the invention.
Figure 4:
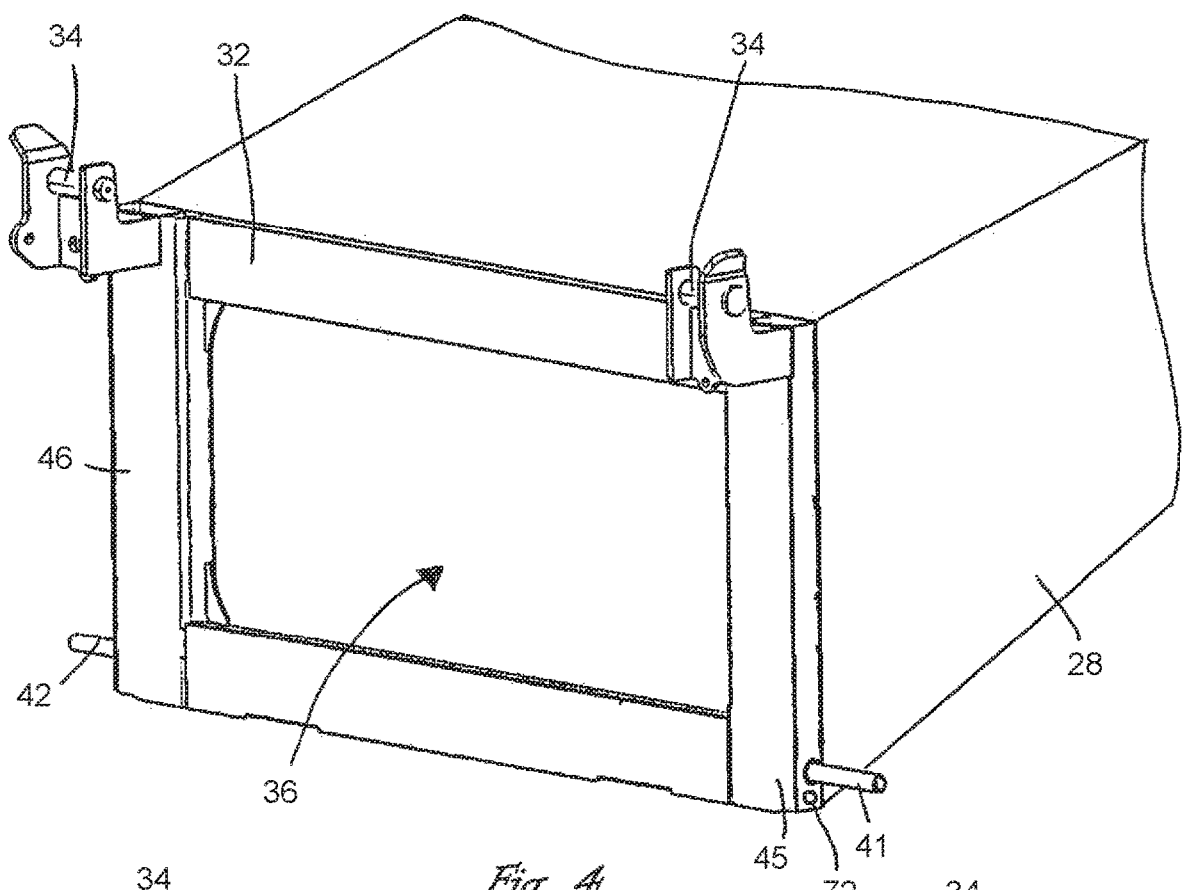
FIG. 4 is a schematic front view of a tilt frame and feederhouse which includes part of the lock proving system in accordance with the first embodiment of the invention.

With reference to FIG. 3, the combine 10 comprises an electronic management system 100 which itself comprises the controller 18 and parts of the lock proving system described above, and is shown in the form of a block diagram. The harvester management system 100 utilises a data bus 82 to place into communication controller 18, operator console 19, header lock actuator 52 and header lock proving sensor 80.

The controller 18 comprise control circuitry 84 which may be embodied as custom made or commercially available processor, a central processing unit or an auxiliary processor among several processors, a semi-conductor based micro-processor (in the form of a micro-chip), a macro processor, one or more applications specific integrated circuits, a plurality of suitably configured digital logic gates, and/or other well-known electrical configurations comprising discrete elements both individually and in various combinations to coordinate the overall operation of the combine 10.

The controller 18 further comprises memory 85. The memory 85 may include any one of a combination of volatile memory elements and non-volatile memory elements. The memory 85 may store a native operating system, one or more native applications, emulation systems, emulated applications for any of a variety of operating systems and/or emulated hardware platforms, emulated operating systems etc. For example, control of the actuator 52 may be implemented through software or firmware executing on a processor of the control circuitry 84. The memory 85 may be separate from the controller 18 or may be omitted.

The controller 18 is also in communication with a header driveline coupling system 86 such as that disclosed by WO-2016/207708, the content of which is incorporated herein by reference. The driveline coupling system 86 serves to automatically couple and uncouple a driveline between the combine 10 and the header 12 and comprises an actuator configured to control movement of coupler elements (not shown). The controller 18 is configured to initiate the driveline coupling system 86 to couple the driveline only when a positive signal is received from the header lock proving sensor 80. Activation of the driveline coupling system 86 may be automatic through control algorithms stored in the memory 85, or by manual command from the operator via the operator console 19. By preventing activation of the driveline coupling system 86 until correct engagement of the locking mechanism 40 is proved, the risk of damaging the driveline couplers is avoided.

The operator console 19 may be provided with a visual and/or audible indication that is controlled by controller 18 and is activated in response to the receipt or absence of a positive signal from the lock proving sensor 80.

Returning to lock proving mechanism 60, and with reference to FIG. 7B, the input pin 64 projects beyond the housing 61 when shifted into the proving position. This provides a visual indicator to the operator that the locking mechanism 40 has engaged correctly, the indicator serving as a visual validation for the operator. In the event of failure of sensor 80, the operator can use this visual indication to make a more informed decision before overriding any automatic control of the driveline coupling system 86 for example.

In a second illustrated embodiment of the invention, an agricultural tractor 90 comprises a front loader 91 shown with a bucket attachment 92 mounted thereto. A lock proving system is provided to indicate, via electronic means, when a locking mechanism has latched the bucket 92 to the front loader 91.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. A lock proving system for an agricultural machine attachment comprising:
    a frame supported by an agricultural machine;
    a removable attachment configured to be mounted upon and supported by the frame in a mounted position;
    a locking mechanism mounted to the frame and comprising a locking element that is shiftable between a retracted position and a locking position;
    a lock proving mechanism mounted to the attachment and comprising an input element mechanically coupled to an output element; and,
    a sensing device mounted to the frame and positioned so as to detect the presence of the output element when in a proving position;
    wherein the frame, attachment and locking mechanism are configured such that, when the attachment is in the mounted position and the locking element is in the locking position, the locking element secures the attachment to the frame, and,
    wherein the locking element, when moved from the retracted position to the locking position, contacts and pushes the input element which causes the output element to shift into the proving position.

2. The system according to claim 1, wherein the input element comprises a first pin, the output element comprises a second pin, and the first pin is coupled to the second pin by a lever which translates linear movement of the first pin into linear movement of the second pin.

3. The system according to claim 1, wherein the input element is coaxial with the locking element when the attachment is in the mounted position.

4. The system according to claim 1, wherein the lock proving mechanism is spring-loaded to bias the output element away from the proving position.

5. The system according to claim 1, wherein the lock proving mechanism is enclosed in a housing.

6. The system according to claim 5, wherein the input element comprises an extension portion that protrudes outside of the housing when the output element is in the proving position so as to provide a visual indicator.

7. The system according to claim 1, wherein the frame is provided with a socket into which the output element extends when in the proving position.

8. The system according to claim 1, wherein the locking element comprises a bolt.

9. The system according to claim 8, wherein the attachment is provided with a socket with which the bolt engages when the attachment is in the mounted position and the locking element is in the locking position.

10. The system according to claim 1, wherein the locking element extends away from the frame when shifting between the retracted position and the locking position.

11. The system according to claim 1, wherein the locking mechanism comprises an actuator for controlling movement of the locking element between the retracted position and the locking position.

12. The system according to claim 11, wherein the actuator is coupled to the locking element via a linkage.

13. The system according claim 1, wherein the sensing device is a proximity sensor.

14. The system according to claim 1, wherein the sensing device comprises a micro-switch which is operated by contact with the output element.

15. The system according to claim 1, further comprising an electronic control unit which is in communication with the sensing device.

16. The system according to claim 15, further comprising a visual or audible indicator that is in electronic communication with the electronic control unit, wherein the visual or audible indicator is activated in response to a positive signal from the sensing device corresponding to sensing of the output element.

17. An agricultural harvester comprising the lock proving system according to claim 1.

18. A combine harvester according to claim 17.

19. The harvester according to claim 17, wherein the frame forms part of a feederhouse which is pivotally mounted to a wheeled chassis and houses a crop conveyor, and wherein the attachment is a crop gathering header configured for mounting to a front side of the feederhouse.

20. The harvester according to claim 19, further comprising a tilt frame mounted to the front side of the feederhouse so as to permit relative movement around a generally longitudinal axis for adjustment of lateral tilt of the header, wherein the locking mechanism and sensing device are mounted to the tilt frame.

21. A utility tractor comprising a front loader and the lock proving system according to claim 1.

22. An agricultural tractor according to claim 21, wherein the attachment is a tool configured for mounting to the front loader.

23. An agricultural machine according to claim 17, wherein the attachment is provided with a plurality of hooks which engage with the frame when the attachment is mounted to the frame.

24. An agricultural machine comprising a lock proving system having:
   a frame supported by an agricultural machine;
   a removable attachment configured to be mounted upon and supported by the frame in a mounted position;
   a locking mechanism mounted to the frame and comprising a locking element that is shiftable between a retracted position and a locking position;
   a lock proving mechanism mounted to the attachment and comprising an input element mechanically coupled to an output element; and,
   a sensing device mounted to the frame and positioned so as to detect the presence of the output element when in a proving position;
   wherein the frame, attachment and locking mechanism are configured such that, when the attachment is in the mounted position and the locking element is in the locking position, the locking element secures the attachment to the frame, and,
   wherein the locking element, when moved from the retracted position to the locking position, contacts and pushes the input element which causes the output element to shift into the proving position, and a driveline coupling system for automatically coupling and uncoupling a driveline between the frame and the attachment, wherein the coupling system is activated by an electronic control unit only when a positive signal from the sensing device corresponding to sensing of the output element has been received.

* * * * *